(12) United States Patent
Hsu

(10) Patent No.: US 7,222,230 B2
(45) Date of Patent: May 22, 2007

(54) SYSTEM AND METHOD FOR MANUAL FAIL-SAFE BOOTSTRAP BASED ON A SINGLE FLASH ROM

(75) Inventor: Shun-I Hsu, Tu-chen (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 344 days.

(21) Appl. No.: 10/861,741

(22) Filed: Jun. 3, 2004

(65) Prior Publication Data

US 2005/0005192 A1   Jan. 6, 2005

(30) Foreign Application Priority Data

Jun. 3, 2003   (TW) .............................. 92115107 A

(51) Int. Cl.
*G06F 15/177*   (2006.01)
(52) U.S. Cl. .................. 713/2; 713/1; 714/5; 714/6; 714/36; 714/38; 365/185.33
(58) Field of Classification Search ............... 713/1, 713/2; 714/5, 6, 36, 3; 365/185.33
See application file for complete search history.

(56) References Cited

U.S. PATENT DOCUMENTS

| | | | |
|---|---|---|---|
| 5,210,854 A | 5/1993 | Beaverton et al. | |
| 5,432,927 A | 7/1995 | Grote et al. | |
| 6,205,548 B1 * | 3/2001 | Hasbun | 713/2 |
| 6,430,663 B1 * | 8/2002 | Ding | 711/162 |
| 6,473,856 B1 * | 10/2002 | Goodwin et al. | 713/2 |
| 6,535,974 B1 * | 3/2003 | Chang et al. | 713/1 |
| 6,591,376 B1 * | 7/2003 | VanRooven et al. | 714/36 |
| 6,978,363 B2 * | 12/2005 | Larvoire | 713/1 |
| 6,981,136 B2 * | 12/2005 | Fuse et al. | 713/2 |
| 7,024,581 B1 * | 4/2006 | Wang et al. | 714/2 |
| 2002/0188886 A1 * | 12/2002 | Liu et al. | 714/6 |
| 2003/0005277 A1 * | 1/2003 | Harding et al. | 713/2 |
| 2004/0025002 A1 * | 2/2004 | Cepulis et al. | 713/2 |
| 2005/0251673 A1 * | 11/2005 | Bosley et al. | 713/2 |

\* cited by examiner

*Primary Examiner*—A. Elamin
(74) *Attorney, Agent, or Firm*—Wei Te Chung

(57) ABSTRACT

A system for manual fail-safe bootstrap based on a single flash Read-Only Memory (ROM) includes a flash ROM (130) and an address map circuit (120). The flash ROM stores a main boot code (1301) in a first address section (1303) thereof, and a backup boot code (1302) in a second address section (1304) thereof. The address map circuit connects to a Central Processing Unit (CPU) (100) and the flash ROM, and includes a selector (400), an inverter (410), an AND gate (420) and a switcher (430). A related method for manual fail-safe bootstrap based on a single flash ROM is also provided.

4 Claims, 3 Drawing Sheets

SYSTEM AND METHOD FOR MANUAL FAIL-SAFE BOOTSTRAP BASED ON A SINGLE FLASH ROM

BACKGROUND OF THE INVENTION

1. Field of the Invention

The present invention relates to bootstrap loading systems and methods for digital computers, and more particularly to a system and method for manual fail-safe bootstrap based on a single rewritable non-volatile memory.

2. Prior Art of the Invention

In order to start using a personal computer system, it must be switched from a "cold" or "off" status to an initiated status, in which an operating system or kernel software is loaded and control of the computer can be attained. That is, the computer is not functional in interacting with its environment or in running software applications until the operating system or kernel software has been loaded via a boot process.

Commencement of the loading process is accomplished by a series of steps or levels. The way in which a computer utilizes such a series to get started is analogized to the computer "picking itself up by its own bootstraps." Hence the term "boot" is used to describe the process. The first level for the loading process of booting is provided in non-volatile memory, and commences at a default address thereof. The non-volatile memory may, for example, be an EEPROM (Electrically Erasable Programmable Read-Only Memory) or a flash ROM (Read-Only Memory). Upon power up or reboot, a computer is hard-wired to commence operation of a software routine at the default address. These fixed instructions typically have just enough intelligence to seek out the next level of the program loading sequence, which is often stored on a rotating medium such as a hard disk.

The first level of booting provided in an EEPROM or a flash ROM is susceptible to deletion, which results in misses. That is, because an EEPROM or a flash ROM allows users to erase existing data and rewrite new data therein, part or all of the first level of booting may be accidentally erased. In addition, the main boot segment for storing the first level of booting may be corrupted by accidental mechanical or human interference. To circumvent these problems, it is desired to provide functions for automatic boot which ensure that the first level boot software can be loaded successfully.

Technology for helping computer administrators supervise database backup is disclosed in U.S. Pat. No. 5,432,927 issued on Jul. 11, 1995 and entitled "Fail-Safe EEPROM Based Rewritable Boot System." This patent discloses a system with two EEPROMs in a computer. One of the EEPROMs stores a boot code, and the other EEPROM stores a backup copy of the boot code for rebooting of the computer when the first boot code fails. However, the system requires two EEPROMs for providing the backup reboot, necessitating the extra cost for the additional EEPROM. Accordingly, what is needed is a new system which requires only a single non-volatile memory and which can still provide a safe reboot when a first level boot fails.

SUMMARY OF THE INVENTION

An object of the present invention is to provide a system and method for manual fail-safe bootstrap of a computer based on a single flash ROM.

To accomplish the above objective, a system for manual fail-safe bootstrap based on a single flash ROM in accordance with a preferred embodiment of the present invention comprises a flash ROM and an address map circuit. The flash ROM stores a main boot code in a first address section thereof and a backup boot code in a second address section thereof. The address map circuit connects to a Central Processing Unit (CPU) and the flash ROM, and is for enabling the CPU to retrieve the backup boot code by switching between the first address section and the second address section of the flash ROM. The address map circuit comprises a selector, an inverter, an AND gate, and a switcher The switcher is a manual electronic mechanism with dual mode output. The dual modes are a switch-on mode and a switch-off mode.

Further, the present invention provides a preferred method for manual fail-safe bootstrap based on a single flash ROM, comprising steps of: (a) turning on the computer; (b) a CPU checking a status of a switcher of an address map circuit; (c) if the switcher is in a switch-on mode, the CPU fetching the main boot code in the flash ROM; (d) if the switcher is in a switch-off mode, the CPU retrieving the backup boot code in the flash ROM; and (e) the computer booting according to the main boot code or the backup boot code.

Other objects, advantages and novel features of the present invention will be drawn from the following detailed description with reference to the attached drawings, in which:

DETAILED DESCRIPTION OF THE INVENTION

Figure 1:
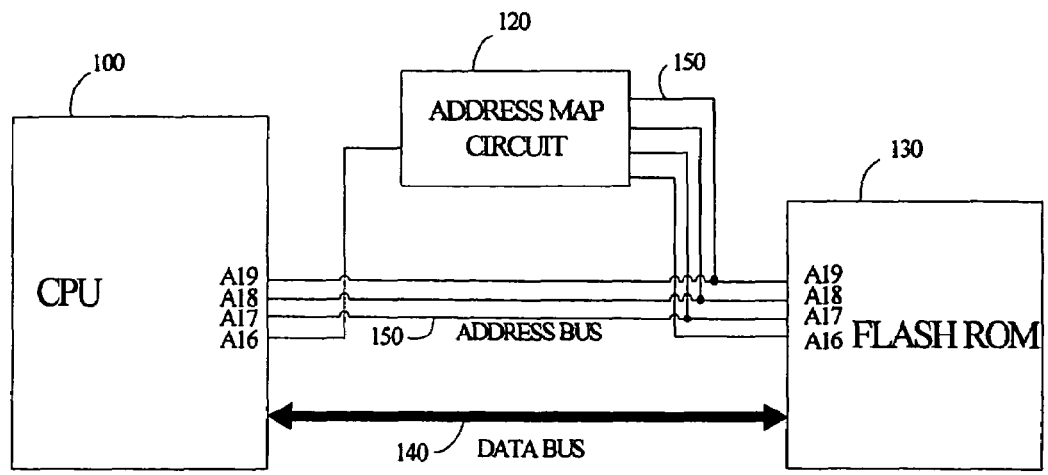
FIG. 1 is a schematic diagram of hardware infrastructure of a system for manual fail-safe bootstrap based on a single flash ROM in accordance with the preferred embodiment of the present invention.

FIG. 1 is a schematic diagram of hardware infrastructure of a system for manual fail-safe bootstrap based on a single flash Read-Only Memory (ROM) (hereinafter, "the system") in accordance with the preferred embodiment of the present invention. The hardware infrastructure comprises a Central Processing Unit (CPU) 100, an address map circuit 120, a flash ROM 130, a data bus 140, and an address bus 150. The CPU 100 can be an Intel® 8086 microprocessor or an equivalent thereof, which can obtain a memory address of the flash ROM 130 via the address bus 150. Thus, via the data bus 140, the CPU 100 can retrieve data stored on the memory address. The address map circuit 120 connects to pin A16 of the CPU 100 and pins A16~A19 of the flash ROM 130 via the address bus 150. Pins A17~A19 of the CPU 100 respectively connect to pins A17~A19 of the flash ROM 130 via the address bus 150.

Figure 2:
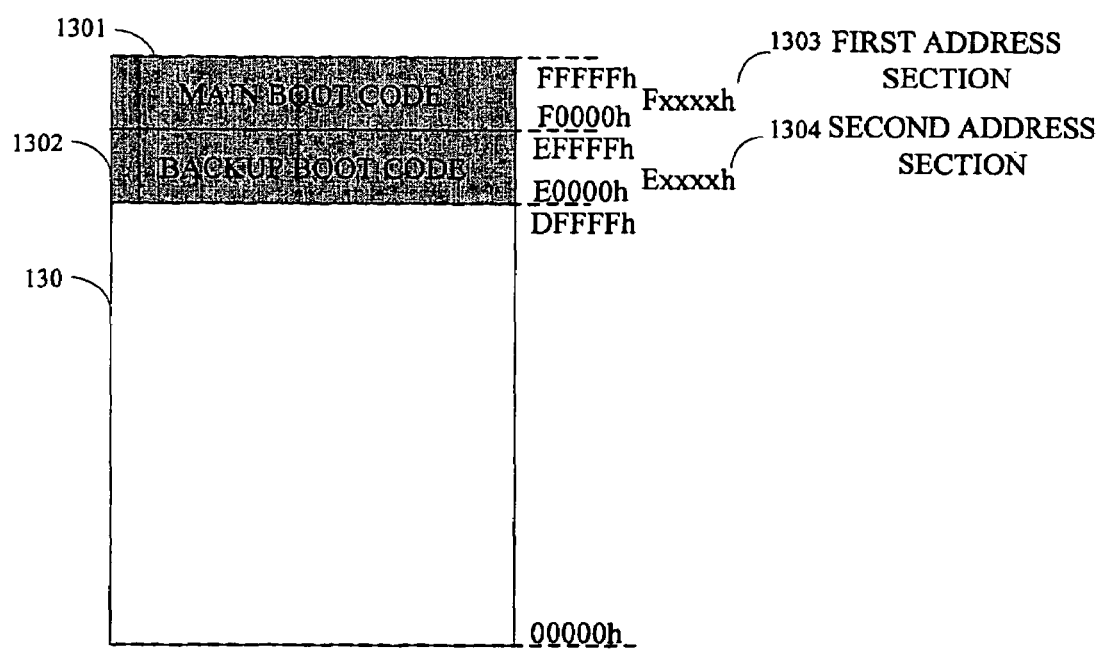
FIG. 2 is a memory map diagram of a flash ROM comprised in the system of FIG. 1.

FIG. 2 is a memory map diagram of the flash ROM 130. The flash ROM 130 stores data on memory addresses from 00000h to FFFFFh (h expresses a hexadecimal figure). There is a main boot code 1301 stored on a first address section 1303 Fxxxxh (which means from F0000h to FFFFFh) of the flash ROM 130, and a backup boot code 1302 stored on a second address section 1304 Exxxxh (which means from E0000h to EFFFFh) of the flash ROM 130.

Figure 3:
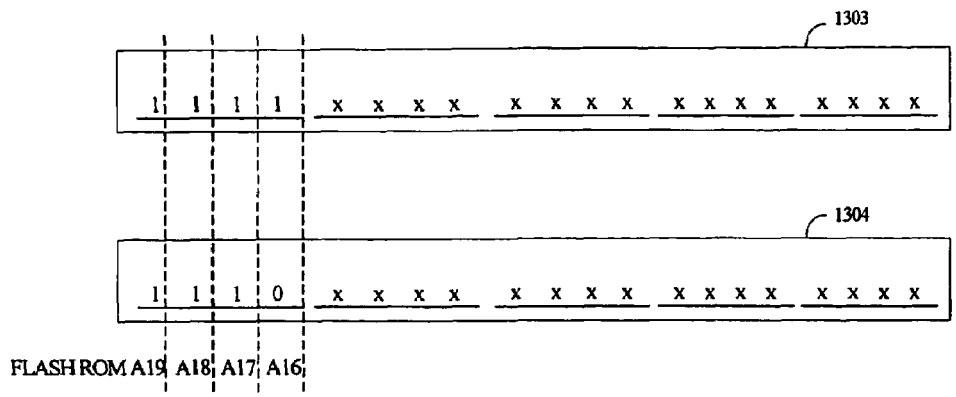
FIG. 3 is a schematic diagram of relationships between pins and stored addresses of the flash ROM of FIG. 2.

FIG. 3 is a schematic diagram of relationships between pins and stored addresses of the flash ROM 130. The first address section 1303 and the second address section 1304 are each represented as 20-bit binary digital expressions. The highest 4 bits of each expression correspond with the outputs of pins A19~A16 respectively. The first address section 1303 and the second address section 1304 differ only at the output of pin A16. Consequently, the CPU 100 can switch to obtain the first address section 1303 or the second address section 1304 for booting based on the binary digital output (0 or 1) of pin A16.

Figure 4:
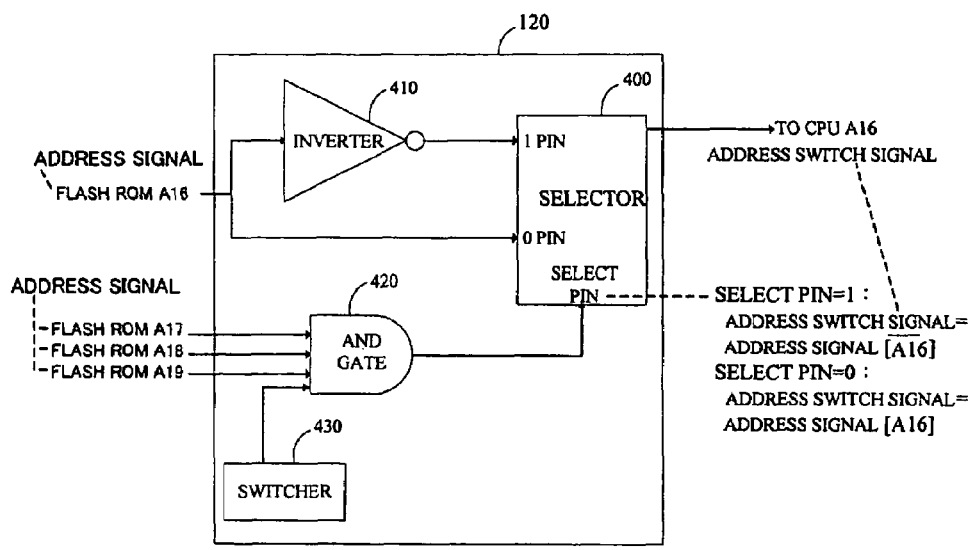
FIG. 4 is a schematic diagram of main units of an address map circuit comprised in the system of FIG. 1.

FIG. 4 is a schematic diagram of main units of the address map circuit 120. The address map circuit 120 comprises a selector 400, an inverter 410, an AND gate 420, and a switcher 430. A plurality of address signals from pins A17~A19 of the flash ROM 130, and a switch signal from the switcher 430, are all received by the AND gate 420 for performing an AND logical operation. The AND gate 420 outputs the result of the AND logical operation to a SELECT pin of the selector 400. A "0" pin of the selector 400 is used for receiving the address signal from pin A16 of the flash ROM 130. By contrast, a "1" pin of the selector 400 is used for receiving a reversed signal of pin A16 of the flash ROM 130 via the inverter 410. When any address signal of pins A17~A19 of the flash ROM 130 is "0," the CPU 100 does not retrieve the main boot code or backup boot code. Therefore, the function of fail or safe boot is not performed. Accordingly, the address signal A16 from the flash ROM 130 is bypassed from the "0" pin of the selector 400 to the output of the selector 400 as the address switch signal. When all of the address signals of pins A17~A19 of the flash ROM 130 are "1," the output of the AND gate 420 depends on the switch signal. If the switch signal is "0," the AND gate 420 outputs "0" to influence the output (address switch signal) of the selector 400 based on the input at the "0" pin (address signal of pin A16 of the flash ROM 130). If the switch signal is "1," the AND gate 420 outputs "1" to influence the output (address switch signal) of the selector 400 based on the input at the "1" pin (said input being the reversed signal from pin A16 of the flash ROM 130). Consequently the output (address switch signal) of the selector 400 instructs the CPU 100 to retrieve the backup boot code 1302 on the second address section 1304 for reboot. The switcher 430 is an electronic mechanism (e.g. a jumper or a switch) with dual modes for a computer user to manually change the mode after he/she finds that the bootstrap loading has failed. Accordingly, while the main boot code 1301 is corrupted, the user can shut down the power of the computer, and then manually change the mode of the switcher 430 for reboot. The dual modes may be a switch-on mode and a switch-off mode, in order to output "0" and "1" as required. It should be noted that one kind of switcher 430 may output "1" under the switch-on mode, and output "0" under the switch-off mode. Another kind of switcher 430 may output "0" under the switch-on mode, and output "1" under the switch-off mode. The desired mechanism of the switcher 430 can be configured according to need.

Figure 5:
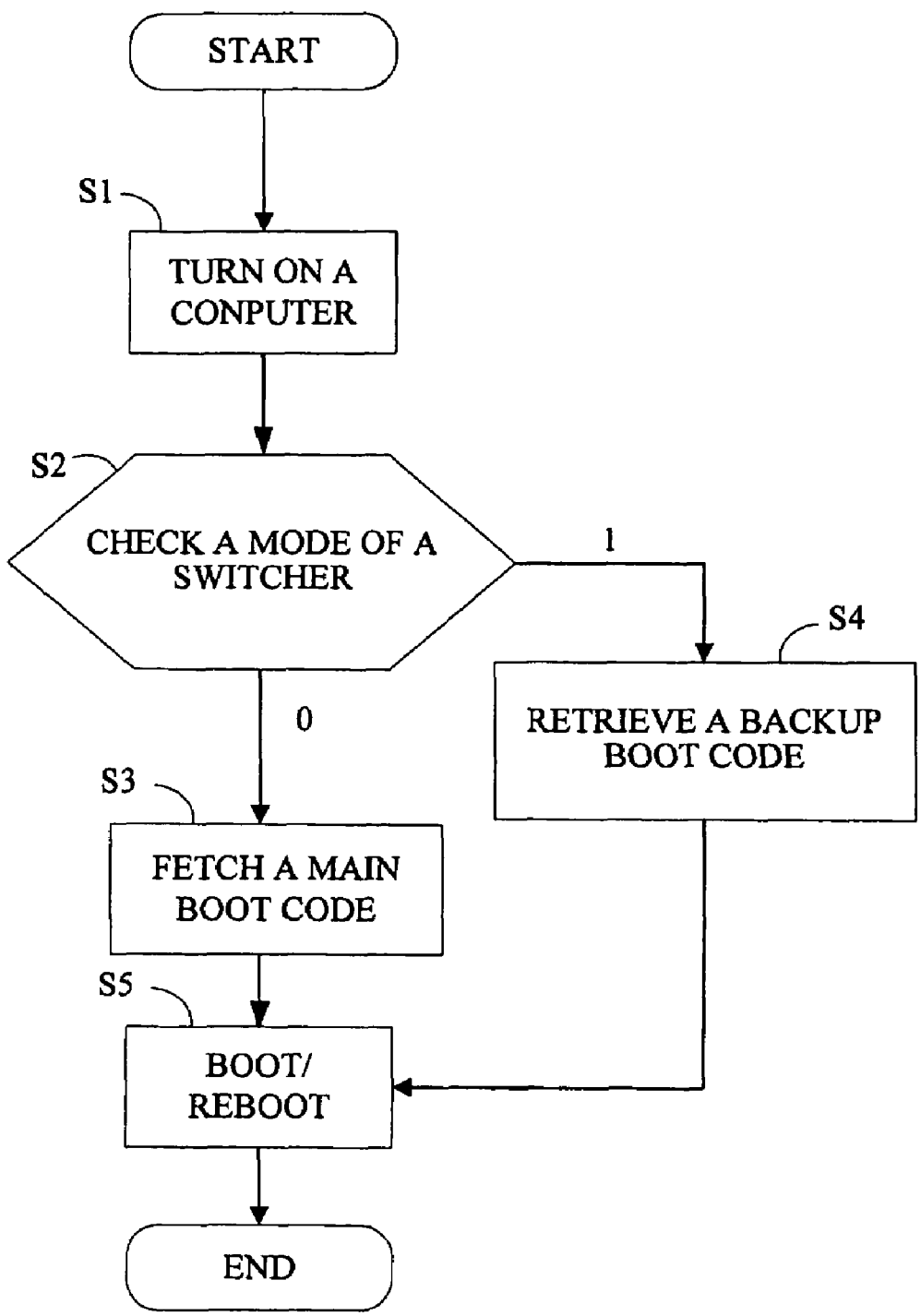
FIG. 5 is a flowchart of the preferred method for manual fail-safe bootstrap based on a single flash ROM in accordance with the present invention.

FIG. 5 is a flowchart of the preferred method for manual fail-safe bootstrap based on a single flash ROM in accordance with the present invention. In step S1, a computer is powered on. In step S2, the CPU 100 of the computer checks an output of the switcher 430. The switcher 430 has dual modes, which may be a switch-on mode or a switch-off mode, in order to output "0" and "1" as required. If the output of the switcher 430 is "0," in step S3, the CPU 100 fetches the main boot code 1301 on the first address section 1303 of the flash ROM 130, whereupon the procedure goes to step S5 described below. If the output of the switcher 430 is "1," in step 54, the CPU 100 retrieves the backup boot code 1302 on the second address section 1304 of the flash ROM 130, whereupon the procedure goes to step S5 described below. In step S5, the computer boots based on the main boot code 1301, or reboots based on the backup boot code 1302.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for manual fail-safe bootstrap based on a single flash Read-Only Memory (ROM), comprising:
    a flash ROM storing a main boot code on a first address section thereof and a backup boot code on a second address section thereof; and
    an address map circuit connecting to a Central Processing Unit (CPU) and the flash ROM, for enabling the CPU to retrieve the main boot code or the backup boot code for booting by checking an output of a switcher, the address map circuit comprising a selector, an inverter, the switcher, and a logic gate that receives a plurality of address signals from the flash ROM and a switch signal from the switcher for performing an AND logic operation.

2. The system for manual fail-safe bootstrap based on a single flash ROM as claimed in claim 1, wherein the backup boot code is a backup copy of the main boot code.

3. The system for manual fail-safe bootstrap based on a single flash ROM as claimed in claim 1, wherein the switcher has a switch-on mode and a switch-off mode.

4. The system for manual fail-safe bootstrap based on a single flash ROM as claimed in claim 3, wherein the switch-on mode is used for instructing the CPU to retrieve the main boot code on the first address section, and the switch-off mode is used for instructing the CPU to retrieve the backup boot code on the second address section.

* * * * *